(12) United States Patent
Grimm

(10) Patent No.: US 11,384,564 B2
(45) Date of Patent: Jul. 12, 2022

(54) SAFETY SWITCH

(71) Applicant: Euchner GmbH + Co. KG, Leinfelden-Echterdingen (DE)

(72) Inventor: Ilo Grimm, Waldenbuch (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 982 days.

(21) Appl. No.: 16/120,478

(22) Filed: Sep. 4, 2018

(65) Prior Publication Data

US 2019/0112836 A1 Apr. 18, 2019

(30) Foreign Application Priority Data

Oct. 18, 2017 (EP) ..................... 17197063

(51) Int. Cl.
| | | |
|---|---|---|
| *E05B 17/22* | (2006.01) | |
| *E05B 47/00* | (2006.01) | |
| *H01H 27/06* | (2006.01) | |
| *F16P 3/08* | (2006.01) | |
| *E05B 49/00* | (2006.01) | |
| *H01H 27/08* | (2006.01) | |
| *F16P 3/10* | (2006.01) | |
| *H01H 21/28* | (2006.01) | |

(52) U.S. Cl.
CPC .......... *E05B 17/22* (2013.01); *E05B 47/0001* (2013.01); *E05B 49/004* (2013.01); *F16P 3/08* (2013.01); *H01H 27/06* (2013.01); *E05B 2047/002* (2013.01); *E05B 2047/0069* (2013.01); *F16P 3/10* (2013.01); *H01H 21/28* (2013.01); *H01H 27/063* (2013.01); *H01H 27/08* (2013.01)

(58) Field of Classification Search
CPC .... E05B 49/004; H01H 21/28; H01H 27/063; H01H 27/08
See application file for complete search history.

(56) References Cited

U.S. PATENT DOCUMENTS

| | | | | |
|---|---|---|---|---|
| 4,912,290 | A | 3/1990 | Tanaka | |
| 5,062,668 | A * | 11/1991 | Onderka | F16P 3/10 |
| | | | | 292/25 |
| 2011/0066288 | A1* | 3/2011 | Sparenberg | F16P 7/00 |
| | | | | 292/144 |

FOREIGN PATENT DOCUMENTS

| | | |
|---|---|---|
| AU | 1811188 A | 1/1989 |
| DE | 4240283 C1 | 11/1993 |
| WO | 2016058718 A1 | 4/2016 |

* cited by examiner

*Primary Examiner* — Vicky A Johnson
(74) *Attorney, Agent, or Firm* — Michael Soderman

(57) ABSTRACT

A safety switch (2) with a latching unit (12), by means of which an associated actuator (3) is held in a latched position. The latching unit (12) has an arrangement of latching jaws (14). Each latching jaw (14) is spring-mounted by means of a spring unit (15). The latching jaws (14) are concentrically arranged and each face one another with a first free end and delimit an insertion opening (A). The latching jaws (14) are held in latched position by the spring forces generated by the spring units (15). The latching jaws (14) can be displaced against the spring forces of the spring unit (15), which serves to enlarge the insertion opening (A).

12 Claims, 4 Drawing Sheets

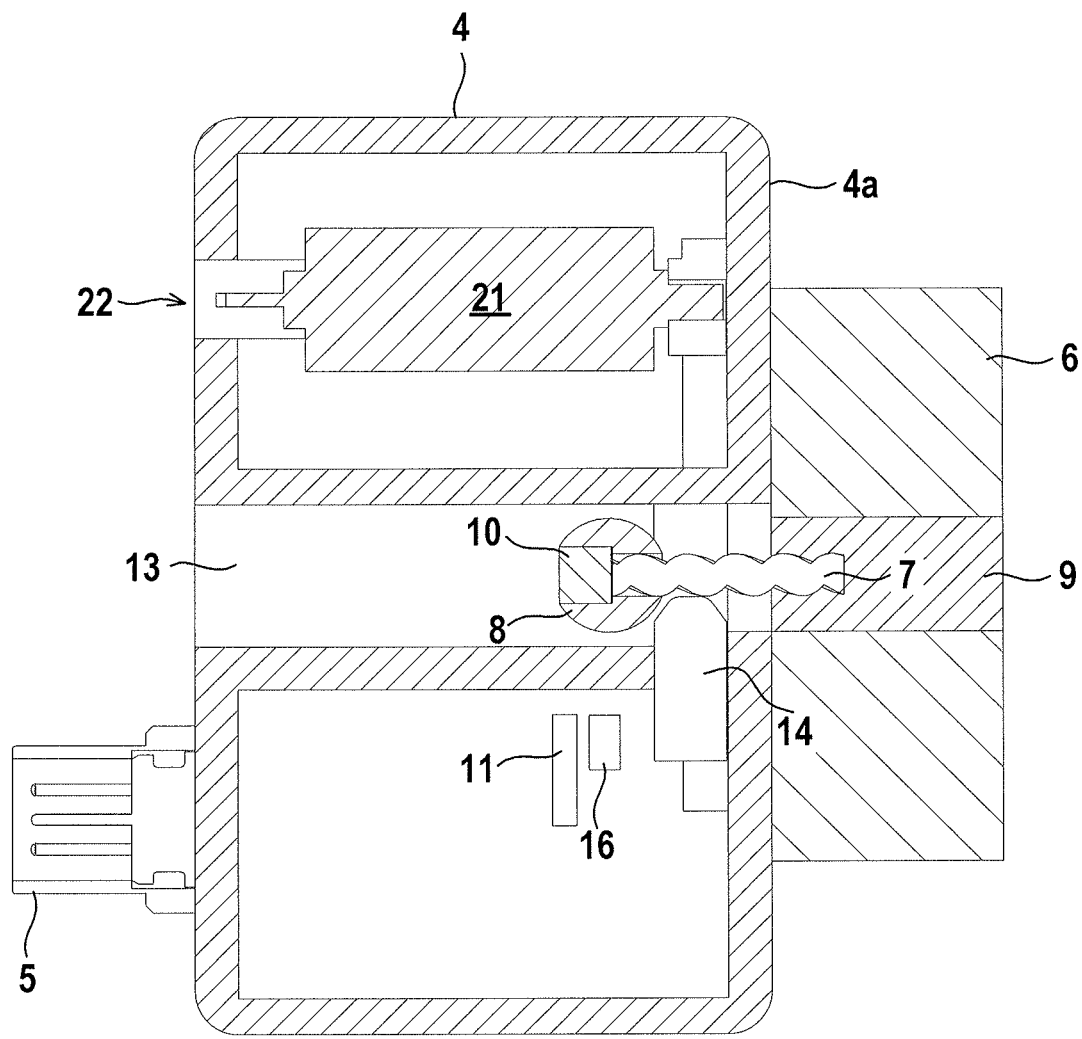

SAFETY SWITCH

CROSS REFERENCE TO RELATED APPLICATIONS

This application claims the priority of EP 17197063.5 filed on 2017 Oct. 18; this application is incorporated by reference herein in its entirety.

BACKGROUND

The invention concerns a safety switch.

Such a safety switch comprises, with an associated actuator, a safety switch arrangement used in the area of safety technology. For use in the area of safety technology, especially in the area of personal protection, the safety switch arrangement must meet standards-compliance requirements with regard to fault reliability, such that it is ensured that an appropriately safe monitoring function can be executed using the safety switch arrangement. Such a safety switch arrangement can typically be used to secure access to a hazard area. For example, a safety switch arrangement can be used as a lock for a barrier protective element, such as a safety door providing access to a hazard area. In this case, a hazardous system inside the hazard area can only be released for operation if the safety door is locked using the safety switch arrangement. The release of the system can be performed using a safety control unit to which safety-related control signals are supplied.

For latching the safety door when the safety door is in its closed position, the actuator, in the form of a bar or similar, is brought into engagement with the safety switch by, for example, inserting the actuator into a recess of the safety switch. This latching process is controlled by means of an RFID reader in the safety switch which detects a transponder in the actuator.

In addition to this latching process, locking of the safety door may be provided. Such a locking device is known, for example, from WO 2016/058718 A1. In this locking device, a locking bolt is provided that is actuated by means of an electric motor having a planetary gear train.

With the electric drive, the locking bolt can be moved into a blocking position in which the actuator is locked by the locking bolt.

SUMMARY

The invention concerns a safety switch (2) with a latching unit (12), by means of which an associated actuator (3) is held in a latched position. The latching unit (12) has an arrangement of latching jaws (14). Each latching jaw (14) is spring-mounted by means of a spring unit (15). The latching jaws (14) are concentrically arranged and each face one another with a first free end and delimit an insertion opening (A). The latching jaws (14) are held in latched position by the spring forces generated by the spring units (15). The latching jaws (14) can be displaced against the spring forces of the spring unit (15), which serves to enlarge the insertion opening (A).

DETAILED DESCRIPTION

The invention seeks to solve the problem of providing a compact safety switch that enables a reliable safety function.

For resolving this problem, the features of claim 1 are provided. Advantageous embodiments and useful further developments of the invention are described in the dependent claims.

The invention concerns a safety switch with a latching unit by means of which an associated actuator can be held in a latched position. The latching unit has an arrangement of latching jaws. Each latching jaw is spring-mounted by means of a spring unit. The latching jaws are concentrically arranged, each of which faces the others with a first free end, and delimit an insertion opening. The latching jaws are held in latched position by spring forces generated by the spring unit. The latching jaws can be displaced against the spring forces of the spring unit, which serves to enlarge the insertion opening. In general, the actuator is held and engaged in the latched position.

The small and compact design of the safety switch represents an essential advantage.

The safety switch is easy to install and can be used flexibly in combination with an actuator to create a safety switch arrangement. The safety switch arrangement formed in this manner can generally be used in the area of safety technology, especially for securing access to a hazard area.

The functional principle of the latching unit of the safety switch according to the invention is such that the actuator, with its front free end, is inserted through the insertion opening, wherein the diameter of the front end of the actuator is slightly larger than the diameter of the insertion opening delimited by the free ends of the latching jaws, such that when the front end of the actuator moves, the latching jaws are displaced against the spring forces of the spring unit. The geometry of the actuator is matched to the latching unit such that when the actuator is inserted into its latched position, the latching jaws return to their latched position by means of the spring forces of the spring unit and grip behind the front end of the actuator, whereby safe latching and engaging functionality of the actuator is ensured.

It is especially advantageous if the actuator is matched to the latching unit of the safety switch such that the latter has an actuator head that is connected to a core body of the actuator by a connecting element. The longitudinal axis of the connecting element is advantageously oriented in a stable base position perpendicular to the surface of the core body and has high rigidity in its axial direction. The actuator head can thus be moved against the insertion opening of the latching unit with contact pressure, whereby the latching jaws are displaced against the spring forces of the spring unit and the actuator moves into the latched position. In the latched position of the actuator, the latching jaws are moved into their latched position and grip behind the actuator such that the actuator is held securely in the latched position. In this regard it is essential that the diameter of the connecting element is smaller than or equal to the diameter of the insertion opening, such that the latching jaws can on their own return to their latched position after the actuator head passes.

The latching jaws are kept spring-loaded in the latched position by means of the spring forces exerted by the spring unit, which ensures reliable locking and engaging functionality.

One advantage of the latching unit according to the invention is that for inserting the actuator into the latching unit, the individual lifting distances of the latching jaws are kept small while the actuator head passes, since the lifting movement is distributed among multiple latching jaws.

It is also advantageous that the actuator can be moved into the latched position not only by applying pressing forces, but also released from the latching unit by applying pulling forces, which makes it possible to unlatch the actuator while it is under load.

A geometrically advantageous design of the latching unit results from the longitudinal axes of the latching jaws extending in the radial direction, wherein the extensions of the longitudinal axes intersect at the center point of the insertion opening and wherein the latching jaws can be displaced in the direction of their longitudinal axes.

This arrangement has short lifting distances for the latching jaws and enables insertion of the actuator into the insertion opening. Additionally, there is good, direct transmission of the spring forces across the latching jaws to the actuator so that it is securely held in the latched position, i.e., an engaged position.

It is further advantageous that the latching jaws form an arrangement with rotational symmetry, wherein the actuator head of the actuator also exhibits appropriate rotational symmetry, and specifically, is sphere-shaped. This results in an even, symmetrical distribution of the forces exerted by the latching jaws on the actuator head. For this purpose, the individual latching jaws are formed identically, in particular.

According to an especially advantageous embodiment, three latching jaws are provided, the longitudinal axes of which are arranged at offsets of 120° relative to one another.

According to an especially advantageous embodiment of the invention, the latching unit has an associated locking unit by means of which the latching jaws are locked in their latched positions.

An additional safety function of the safety switch is provided by means of this locking.

It is especially advantageous if the locking unit forms a link with a cavity. This cavity is bordered by a wall segment forming an inner contour. The latching jaws are arranged inside the cavity. Segments of the inner contour form means to lock the latching jaws.

This link has a straightforward mechanical structure. It is further advantageous that with the link, all latching jaws are simultaneously locked.

Advantageously the link forms a disc-shaped body that is adapted to the geometries of the latching jaws and only takes up a small installation space, which in turn gives the entire safety switch a compact construction.

Advantageously the link is rotatable about a rotary axis wherein the rotary axis advantageously extends perpendicular to the disc-plane of the link. The rotary motion of the link is created using an electric drive.

The functioning of the locking unit formed in this manner is such that in first rotary positions of the link, the segments of the inner contour lie closely against the second free ends of the latching jaws, by means of which movement of the latching jaws out of the locking position is blocked, thereby effecting the locking function.

Then in second rotary positions of the link, the second free ends of the latching jaws lie at a distance from the link, such that the latching jaws can be displaced against the spring forces of the spring unit.

By means of the structure of the latching jaws with rotational symmetry and the matching rotation-symmetrical design of the segments of the link that effect the locking function, the electric drive can be laid out for rotation in only one rotation direction in order to further rotate the link in discrete angle steps to effect the locking of the latching jaws, on one hand, or the releasing of the locking, on the other.

In this regard, the identical structure of the latching jaws and their rotational-symmetrical arrangement in the latching unit is advantageously exploited. The segments of the link used to effect the locking are adjusted to these latching jaws in terms of their number and symmetry, such that each segment of the link can be used to lock any given latching jaw. To move the latching jaws into the locked or un-locked state, it is only necessary to further rotate by a small angle. If the latching unit has, for example, three identical latching jaws arranged with an offset of 120°, to move the locking unit from a locked state of the latching jaw into an unlocked state, the link only has to be rotated an additional 60°, and then 60° further in the same direction in order to effect locking of the latching jaws.

The locking unit formed in this manner has a straightforward design as well as high functional reliability.

It is especially advantageous if a mechanical auxiliary unlocking feature is associated with the electrical drive.

The drive can be further rotated mechanically by actuating the auxiliary unlocking, such as by using a screwdriver, which has the effect of releasing the locking function of the locking unit. It makes sense to do this, in particular, if the drive is in an unpowered state.

According to an advantageous embodiment, the positions of the latching jaws are monitored by means of sensors.

The sensors, such as those formed by retro-reflective sensors, can be used to monitor the latching function of the latching jaws. In particular, the latching positions of the latching jaws can be checked.

It is further advantageous to monitor the latched position of the actuator by recording signals from a transponder in the actuator head with a reader unit of the safety switch.

This monitoring function can be used to identify errors in the locking of the actuator. This represents an essential measure to meet the required safety level for the use of the safety switch arrangement in the area of safety technology.

BRIEF DESCRIPTION OF THE DRAWINGS

The invention is explained below based on the drawings. They show:

FIG. 3 Longitudinal cross-section of the safety switch from FIG. 1.

DETAILED DESCRIPTION OF THE PREFERRED EMBODIMENTS

Figure 1:
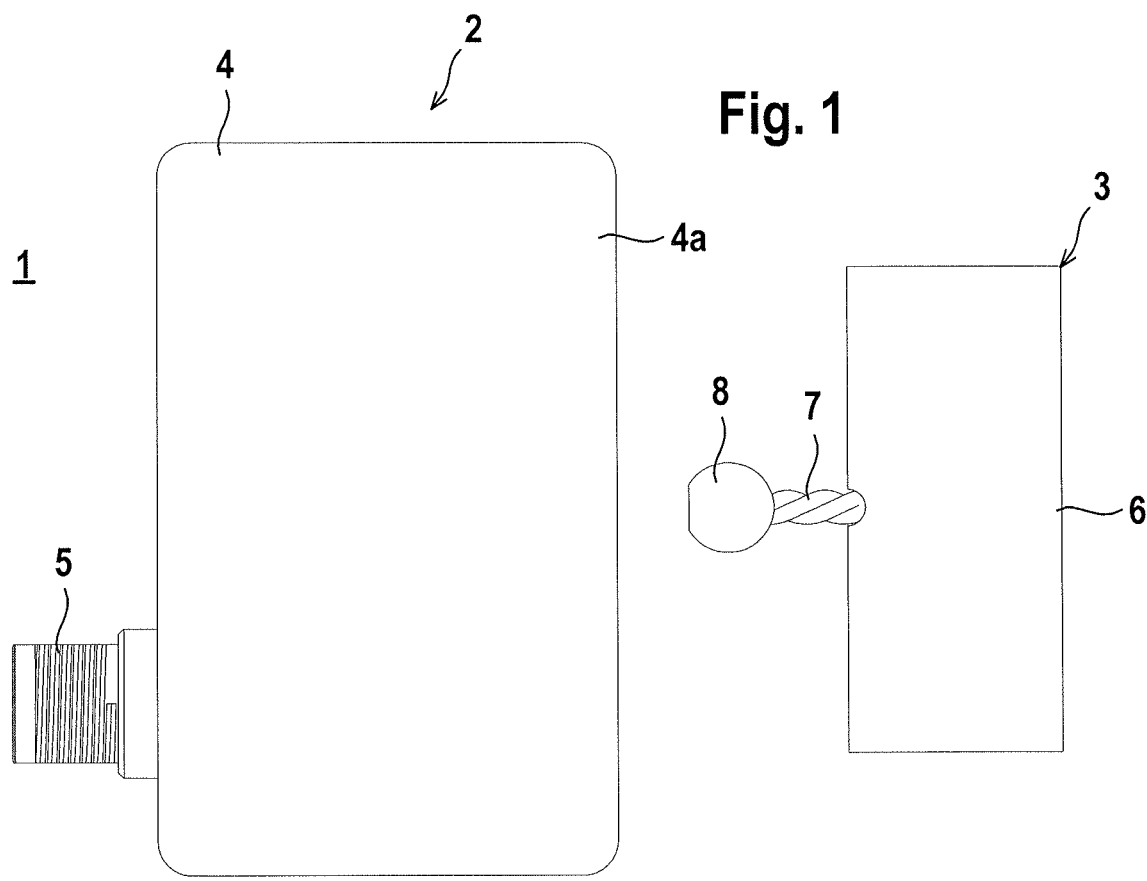
FIG. 1 Exemplary embodiment of the safety switch arrangement in accordance with the invention with a safety switch and an actuator.

FIG. 1 shows schematically an exemplary embodiment of a safety switch arrangement 1 with a safety switch 2 and actuator 3.

This safety switch arrangement 1 can be used, for example, to secure a protected door that serves as access to a hazard area. The actuator 3 can be arranged on the protective door, the safety switch 2 can be arranged on a frame that delineates the door opening, which is closed up by the protective door.

The components of the safety switch 2 are integrated into a housing 4 from which a cable connector 5 protrudes for connection to external units.

Figure 2:
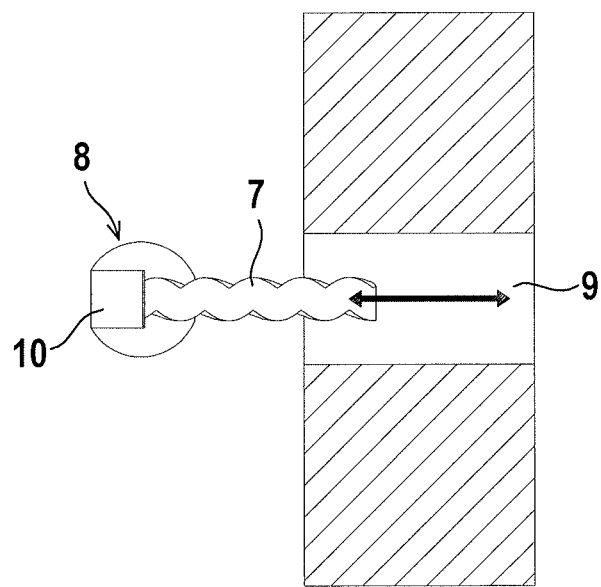
FIG. 2 Longitudinal cross-section of the actuator of the safety switch arrangement from FIG. 1.

As is evident from FIG. 1 and, in particular, FIG. 2, the actuator 3 has a core body 6 in which a connecting element 7 is mounted. The connecting element 7 is formed by an elongated body, the cross-section of which is at least approximately constant over its entire length.

The connecting element 7 is mounted in the core body 6 with its first free end such that the longitudinal axis of the connecting element 7 is oriented perpendicular to the surface of the core body 6. At the other end of the connecting element 7, an actuator head 8 is mounted. In the present case, the actuator head 8 is sphere-shaped. In principle, the actuator head 8 can also be formed by another body with rotational symmetry. In principle, the actuator head 8 can also have a polygonal cross-section. In any case the actuator head 8 has a larger cross-sectional area than the connecting element 7, such that the actuator head 8 projects across its entire cross-sectional plane beyond the connecting element 7.

In principle, the connecting element 7 can be made of plastic or a metallic material. In the present case, the connecting element 7 is made of a short piece of steel cable.

In general, the connecting element 7 is made of a material that ensures high rigidity of the connecting element 7 in the axial direction and which maintains the connecting element 7 in its base position shown in FIGS. 1 and 2, especially when the effects of gravity are present. At the same time, the connecting element 7 has flexibility, i.e., elastic deformability, such that when exposed to forces, it can be deformed such that the actuator head 8 can be pivoted out along a plane extending transverse to the longitudinal axis.

As shown by the double arrow in FIG. 2, the connecting element 7 is mounted in a guide 9 of the core body 6 such that it can be pulled out of or pushed into the core body 6, such that the length of the part of the connecting element 7 projecting beyond the core body 6 can be varied. The connecting element 7 can be fixed at any position.

As is further evident from FIG. 2, a transponder 10 is mounted in the actuator head 8.

As shown in FIG. 3, a reading unit in the form of a reading coil 11 is arranged in the safety switch 2. The reading coil 11 can be used to receive signals sent by the transponder 10 in the actuator head 8 when the actuator 3 has been moved into a latched position, i.e., engaged position, in the safety switch 2, as shown furthermore in FIG. 3.

Figure 4A:
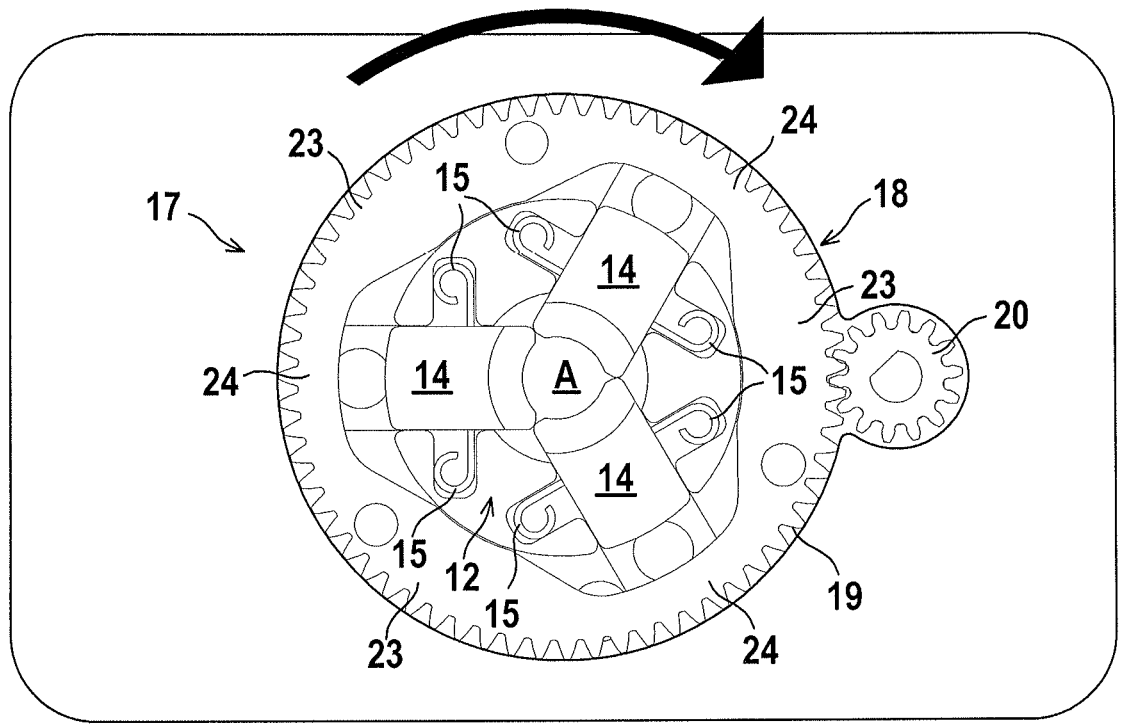
FIG. 4A Depiction of a section of the safety switch from FIG. 1 with the components of a latching unit and a locking unit with locking deactivated FIG. 4B Depiction of a section of the safety switch from FIG. 1 with the components of a latching unit and a locking unit with locking activated FIG. 5A A state of the latching unit and locking unit during insertion of the actuator into a latched position FIG. 5B Another state of the latching unit and locking unit during insertion of the actuator into a latched position FIG. 5C A further state of the latching unit and locking unit during insertion of the actuator into a latched position
Figure 4B:
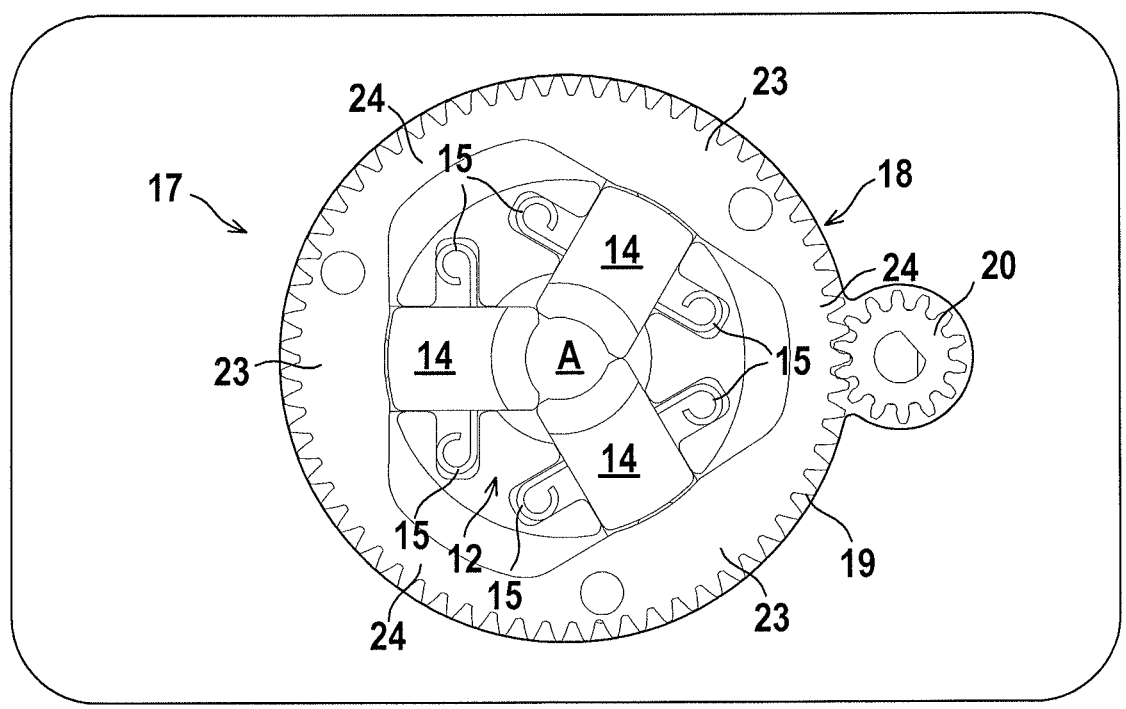

For secure latching of the actuator 3 in its latched position, the safety switch 2 has a latching unit 12, the components of which are shown in a top-down view in FIGS. 4A and 4B. The latching unit 12 is located in the region behind the front wall 4a of the housing 4 of the safety switch 2.

In the latched position of the actuator 3, the actuator head 8 lies within a guide channel 13 in the safety switch 2. The components of the latching unit 12 thereby grip behind the actuator head 8, thereby engaging the actuator 3, i.e., the actuator 3 is secured against slipping out of the safety switch 2.

In the present case, the latching unit 12 has three identically-formed latching jaws 14 arranged concentrically such that their first free ends delimit an insertion opening A. The longitudinal axes of the latching jaws 14 extend in the radial direction. The extensions of these longitudinal axes intersect at the center of the insertion opening A. Each latching jaw 14 is spring-mounted by means of a spring unit 15, which in the present case is formed by a single spring. The spring forces keep the latching jaws 14 in their latched position, i.e., engaged position, shown in FIGS. 4A and 4B.

The latching jaws 14 are arranged in a rotationally-symmetrical manner relative to one another at offsets of 120°. Each latching position of the latching jaws 14 is monitored with a retro-reflective sensor 16.

The latching unit 12 has an associated locking unit 17. The locking unit 17 has a disc-shaped link 18. The outer contour of the link 18 has a toothing 19 that engages with a cog wheel 20. The cog wheel 20 can be placed into rotational motion by means of an electric drive in the form of an electric motor 21, whereby the link 18 also rotates about a rotational axis extending perpendicular to the disc axis.

A mechanical auxiliary unlocker 22 is associated with the electric motor 21. In the unpowered state of the safety switch 2, the electric motor 21 and thereby also the link 18, can be mechanically rotated by actuating the auxiliary unlocker 22, e.g., with a screwdriver.

The link 18 has a central cavity within which the latching jaws 14 of the latching unit 12 are arranged. The cavity is delimited by a wall segment of the link 18 that forms an inner contour.

The symmetry of the inner contour matches the symmetry of the latching jaws 14. Accordingly, the inner contour has three identically formed segments 23, rotated by 120°, that serve to lock the latching jaws 14 in place. Two adjacent segments 23 are each connected by an intermediate segment 24 of the inner contour. The intermediate segments 24 are also identically formed.

FIG. 4A shows the locking unit 17 with deactivated locking function. Here the link 18 is rotated by means of the electric motor 21 in a rotary position in which the intermediate segments 24 lie in the region of the latching jaws 14. The intermediate segments 24 are formed such that they lie at a distance from the rear, second free ends. In this way, the latching jaws 14 can be displaced against the spring forces of the spring unit 15 from their latched positions, i.e., engaged positions, and can be moved in the direction of the intermediate segments 24.

FIG. 4B shows the locking unit 17 with activated locking. Here the link 18 is rotated by means of the electric motor 21 into a rotary position in which the segments 23 of the inner contour lie in the region of the latching jaws 14. The segments 23 of the inner contour lie tightly against the latching jaws 14 such that a movement of the latching jaws 14 from the latched positions is blocked, which effects a locking function.

The transition from the state of deactivated locking function (FIG. 4A) into the state of activated locking function (FIG. 4B) is achieved through further rotating the link 18 by 60° in the direction shown in FIG. 4A. By further rotating the link 18 another 60°, a state with deactivated locking is reached again, and so on.

Figure 5A:
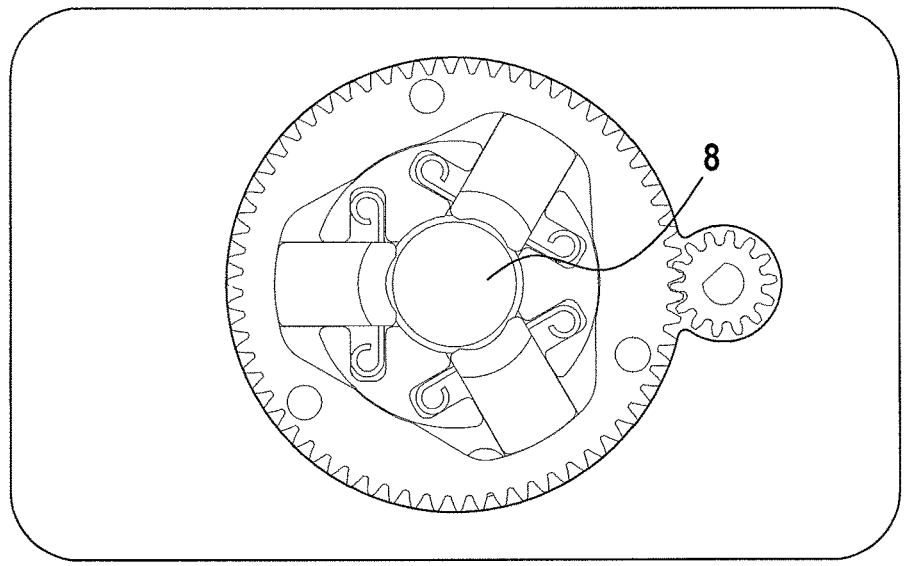
Figure 5B:
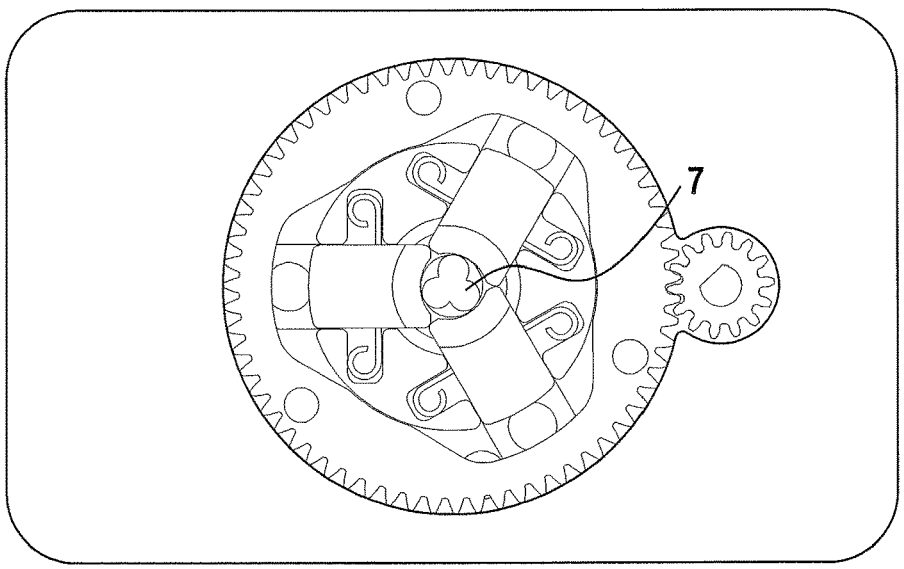
Figure 5C:
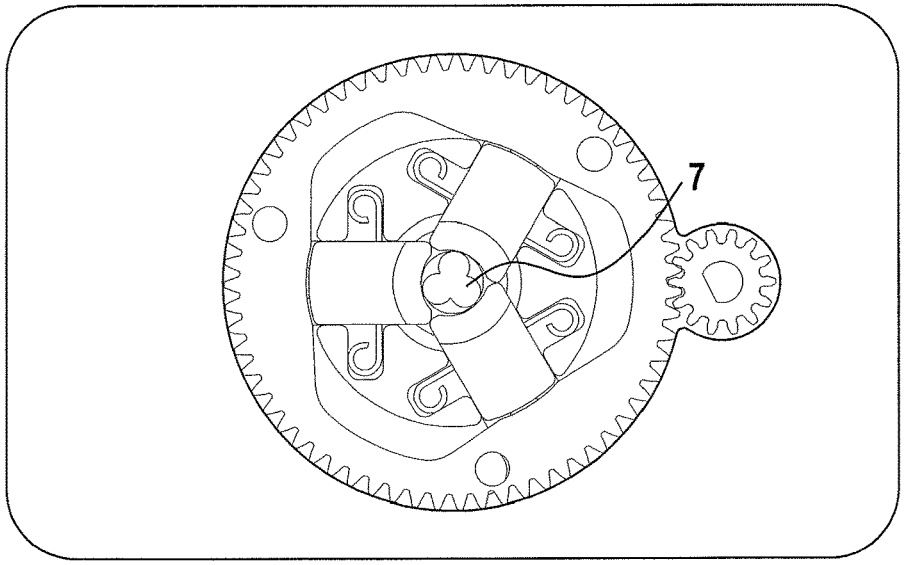

The functioning of the latching and locking of the safety switch arrangement 1 is explained based on FIGS. 5A to 5C.

In the starting position, for example, with open protective door, the actuator 3 lies at a distance from the protective door. When the protective door is closed, the actuator 3 is moved into a latched position inside the safety switch 2.

To do so, first the actuator head 8 is moved against the insertion opening A. Since the actuator head 8 can be arranged transverse to the longitudinal axis of the connecting element 7 by means of the elastic deformability of the connecting element 7, the actuator head 8 self-centers itself at the insertion opening A. The diameter of the actuator head 8 is larger than the diameter of the insertion opening A. Therefore, when the actuator head 8 is moved against the insertion opening A, the pressure forces exerted by the actuator head 8 on the latching jaws 14 displace the latching jaws 14 out of their latched position. This is possible since the locking of the locking unit 17 is deactivated, i.e., the intermediate segments 24 lie in the region of the latching jaws 14. This situation is depicted in FIG. 5A. The actuator head 8 lies in the region of the expanded insertion opening A. The latching jaws 14 are pushed out and back from their latched positions by the actuator head 8 and lie against the intermediate segments 24.

Then the actuator 3 is inserted farther into the safety switch 2, until it lies in the engaged position depicted in FIG. 3, i.e., latched position. In this latched position, the actuator head 8 has passed the latching jaws 14. The latching jaws 14 are therefore returned to their latched position by the spring forces, such that their free ends about the connecting element 7 of the actuator 3 with little play. The latching jaws 14 then grip behind the actuator head 8, wherein the actuator 3 is securely latched and engaged by the spring forces that keep the latching jaws 14 in their latched positions. Now the locking function is still deactivated. This state is shown in FIG. 5B. In this state, the actuator can still be unlatched under load, since the actuator 3 can be pulled by force out of the latching unit 12.

Next, as depicted in FIG. 5C, the locking function is activated, such that the link 18 is rotated against an unlocking.

When the safety switch arrangement 1 according to the invention is used to secure a protective door serving as access to a hazard area, the safety switch 2 can, when the actuator 3 is latched, engaged and locked, emit a switching signal that can be used to release a hazardous system within the hazard area for operation.

LIST OF REFERENCE NUMERALS (1) Safety switch arrangement
(2) Safety switch
(3) Actuator
(4) Housing
(4*a*) Front wall
(5) Cable connection
(6) Core body
(7) Connecting element
(8) Actuator head
(9) Guide
(10) Transponder
(11) Reading coil
(12) Latching unit
(13) Guide channel
(14) Latching jaw
(15) Spring unit
(16) Retro-reflective sensor
(17) Locking unit
(18) Link
(19) Toothing
(20) Cog wheel
(21) Electric motor
(22) Auxiliary unlocker
(23) Segments
(24) Intermediate segment
(A) Insertion opening

The invention claimed is:

1. Safety switch (2) with a latching unit (12), by means of which an associated actuator (3) is held in a latched position, characterized in that the latching unit (12) has an arrangement of latching jaws (14), wherein each latching jaw is spring-mounted by means of a spring unit (15), that the latching jaws (14) are concentrically arranged and each, with a first free end, face one another and delimit an insertion opening (A), that the latching jaws are held in latched positions by means of the spring forces generated by the spring units (15), and that the latching jaws (14) can be displaced against the spring forces of the spring unit (15), whereby the insertion opening (A) is enlarged wherein three latching jaws (14) are provided, the longitudinal axes of which are arranged relative to one another with offsets of 120°.

2. Safety switch (2) according to claim 1, characterized in that the longitudinal axes of the latching jaws (14) extend in radial direction with respect to the central point of the insertion opening, wherein the longitudinal axes intersect at the central point of the insertion opening (A), and wherein the latching jaws (14) can be displaced in the direction of their longitudinal axes.

3. Safety switch (2) according to claim 1, characterized in that the latching jaws (14) are identically formed.

4. Safety switch (2) according to claim 1, characterized in that the positions of the latching jaws (14) are monitored by means of sensors.

5. Safety switch arrangement (1) with an actuator (3) and a safety switch (2) according to claim 1, characterized in that the safety switch (2) has the latching unit (12) with the arrangement of latching jaws (14), wherein each latching jaw (14) is spring-mounted by means of the spring unit (15), wherein the latching jaws (14) are concentrically arrangement and each, with a first free end, faces the others, and delimit an insertion opening (A), that the actuator (3) has an actuator head (8), wherein the actuator head (8) can be brought through the insertion opening (A) into a latched position, wherein upon passing the insertion opening (A) the actuator head (8) displaces the latching jaws (14) against the spring forces of the spring unit (15), which serves to enlarge the insertion opening (A), and wherein, in the latched position of the actuator (3), the latching jaws (14) in their latched position grip behind the actuator (3).

6. Safety switch arrangement (1) according to claim 5, characterized in that the safety switch (2) has a latching unit (12) with a locking unit (17) associated with it, by means of which the actuator (3) is locked in the latched position, wherein for this purpose the latching jaws (14) that grip behind the actuator head (8) are held in their latched position by means of the locking unit (17).

7. Safety switch arrangement (1) according to claim 5, characterized in that the latched position of the actuator (3) is monitored by recording signals from a transponder (10) in the actuator head (8) with a reader unit of the safety switch (2).

8. Safety switch (2) with a latching unit (12), by means of which an associated actuator (3) is held in a latched position, characterized in that the latching unit (12) has an arrangement of latching jaws (14), wherein each latching jaw is spring-mounted by means of a spring unit (15), that the latching laws (14) are concentrically arranged and each, with a first free end, face one another and delimit an insertion opening (A), that the latching jaws are held in latched positions by means of the spring forces generated by the spring units (15), and that the latching jaws (14) can be displaced against the spring forces of the spring unit (15), whereby the insertion opening (A) is enlarged, wherein the latching unit (12) has a locking unit (17) associated with it by means of which the latching jaws (14) are locked in their latched positions, wherein the locking unit (17) has a link (18) with a cavity delimited by a wall segment that forms an inner contour, wherein the latching jaws (14) are arranged inside the cavity and wherein segments (23) of the inner contour form means to lock the latching jaws (14) in place, and wherein the link (18) is rotatable about a rotational axis.

9. Safety switch (2) according to claim 8, characterized in that the link (18) can be rotated by means of an electric drive.

10. Safety switch (2) according to claim 9, characterized in that a mechanical auxiliary unlocker (22) is associated with the electric drive.

11. Safety switch (2) according to claim 8, characterized in that in first rotational positions of the link (18), the segments (23) of the inner contour tightly abut the second free ends of the latching jaws (14), which serves to block any motion of the latching jaws (14) out of the latched position, thereby activating the locking function.

12. Safety switch (2) according to claim 8, characterized in that in second rotational positions of the link (18), the second free ends of the latching jaws (14) lie at a distance from the link (18) such that the latching jaws (14) can be displaced against the spring forces of the spring unit (15).

\* \* \* \* \*